United States Patent
Brenner et al.

(10) Patent No.: US 7,537,738 B2
(45) Date of Patent: May 26, 2009

(54) FUEL PROCESSING SYSTEM HAVING A MEMBRANE SEPARATOR

(75) Inventors: Annette M Brenner, Honeoye Falls, NY (US); Tai-Chiang Yu, Pittsford, NY (US); Yan Zhang, Victor, NY (US); Steffen Ruf, Wiesbaden (DE)

(73) Assignee: GM Global Technology Operations, Inc., Detroit, MI (US)

( * ) Notice: Subject to any disclaimer, the term of this patent is extended or adjusted under 35 U.S.C. 154(b) by 1057 days.

(21) Appl. No.: 10/348,127

(22) Filed: Jan. 21, 2003

(65) Prior Publication Data

US 2004/0142220 A1  Jul. 22, 2004

(51) Int. Cl.
*C01B 3/24* (2006.01)
*B01J 8/02* (2006.01)
*H01M 8/06* (2006.01)

(52) U.S. Cl. .................. 422/196; 422/197; 422/211; 429/19; 429/34; 423/650

(58) Field of Classification Search .................. 429/39; 423/652, 645
See application file for complete search history.

(56) References Cited

U.S. PATENT DOCUMENTS

| | | | |
|---|---|---|---|
| 3,469,944 A * | 9/1969 | Bocard et al. | 423/650 |
| 5,272,017 A | 12/1993 | Swathirajan et al. | |
| 5,316,817 A | 5/1994 | Timperley | |
| 5,498,278 A * | 3/1996 | Edlund | 96/11 |
| 5,938,800 A | 8/1999 | Verrill et al. | |
| 6,152,995 A | 11/2000 | Edlund | |
| 6,319,306 B1 | 11/2001 | Edlund et al. | |
| 6,572,837 B1 * | 6/2003 | Holland et al. | 423/648.1 |
| 6,656,617 B2 * | 12/2003 | Aoyama et al. | 429/19 |
| 2002/0011152 A1 * | 1/2002 | Oku et al. | 96/4 |
| 2003/0143449 A1 * | 7/2003 | Hunik | 429/34 |
| 2003/0159354 A1 * | 8/2003 | Edlund et al. | 48/127.9 |

FOREIGN PATENT DOCUMENTS

WO  WO 99/46032  9/1999

* cited by examiner

*Primary Examiner*—John S Maples

(57) ABSTRACT

A fuel processing system is provided for reforming a hydrocarbon fuel. This fuel processing system utilizes a membrane separator to separate the hydrogen from the reformate stream. A CO-reduction and cleanup system works with the membrane separator to increase the production of hydrogen.

2 Claims, 6 Drawing Sheets

FUEL PROCESSING SYSTEM HAVING A MEMBRANE SEPARATOR

FIELD OF THE INVENTION

The present invention relates to fuel processing systems, and more specifically to a fuel processing system having a membrane separator for aiding in the reformation of a fuel.

BACKGROUND OF THE INVENTION

Fuel cells have been proposed as a power source for a variety of applications including electrical vehicular power plants replacing internal combustion engines. In proton exchange membrane (PEM) type fuel cells, hydrogen is supplied to an anode of the fuel cell and oxygen is supplied as an oxidant to a cathode of the fuel cell. PEM fuel cells include a membrane electrode assembly (MEA) comprising a thin, proton transmissive, non-electrically conductive, solid polymer membrane-electrolyte having the anode on one of its faces and the cathode on the opposite face. The MEA is sandwiched between a pair of electrically conductive elements which serve as current collectors for the anode and cathode and contain appropriate channels and/or openings therein for distribution of the fuel cell's gaseous reactants over the surfaces of the respective anode and cathode catalysts. A typical PEM fuel cell and its MEA are described in commonly assigned U.S. Pat. Nos. 5,272,017 and 5,316,817 to Swathirajan et al. A plurality of individual fuel cells are commonly stacked together to form a PEM fuel cell stack.

In PEM fuel cells, hydrogen ($H_2$) is implemented as the anode reactant and oxygen ($O_2$) is implemented as the cathode reactant. The oxygen can be supplied in either pure form or as air (a mixture primarily comprising $O_2$ and $N_2$). For vehicular applications, it is desirable to use a liquid fuel, such as methanol, gasoline, diesel and the like, as the source of hydrogen for the fuel cell. Other fuels include ethanol and natural gas. Such fuels are preferential for onboard storage and a national and international infrastructure exists for supplying some such fuels. Such liquid fuels, however, must be dissociated for releasing the hydrogen content thereof. The dissociation reaction is generally accomplished in an autothermal reformer. A conventional, exemplary process is a steam/gasoline reformer where gasoline and water (steam) are ideally reacted to generate hydrogen and carbon dioxide. Additional components such as carbon monoxide may also be present.

Fuel processing systems are well known in the art. Typical fuel processing systems work by using a series of reformers to turn a hydrocarbon fuel into a hydrogen containing reformate stream. These reformers tend to be large and difficult to package. Hence, it is desirable to provide alternatives for the extraction of hydrogen.

It is known that hydrogen can be removed from a reformate stream by using a membrane coated with palladium or palladium alloy. Hydrogen separation membranes, however, tend to be unable to provide the flow of hydrogen needed by the fuel cell to maintain performance levels rivaling internal combustion engines.

Accordingly, a need exists for a fuel processing system with reduced component size and a hydrogen separation device which does not limit performance.

SUMMARY OF THE INVENTION

The present invention provides a membrane for use with a fuel processing system. The fuel processing system employs a reactor to reform a hydrocarbon fuel into a hydrogen containing reformate stream. The reformate stream flows through the membrane separator for removing dissociated hydrogen. The remaining reformate stream, now hydrogen depleted, passes through a reforming system which further dissociates hydrogen from the reformate stream. The membrane separator allows for size reductions in the reforming system. The removal of hydrogen from the reformate stream upstream of CO-reduction and clean up system serves to convert a greater amount of reformate to hydrogen in such downstream system. This combination of both, the membrane separator and the reforming system to separate hydrogen out of the reformate stream, allows for improved performance.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
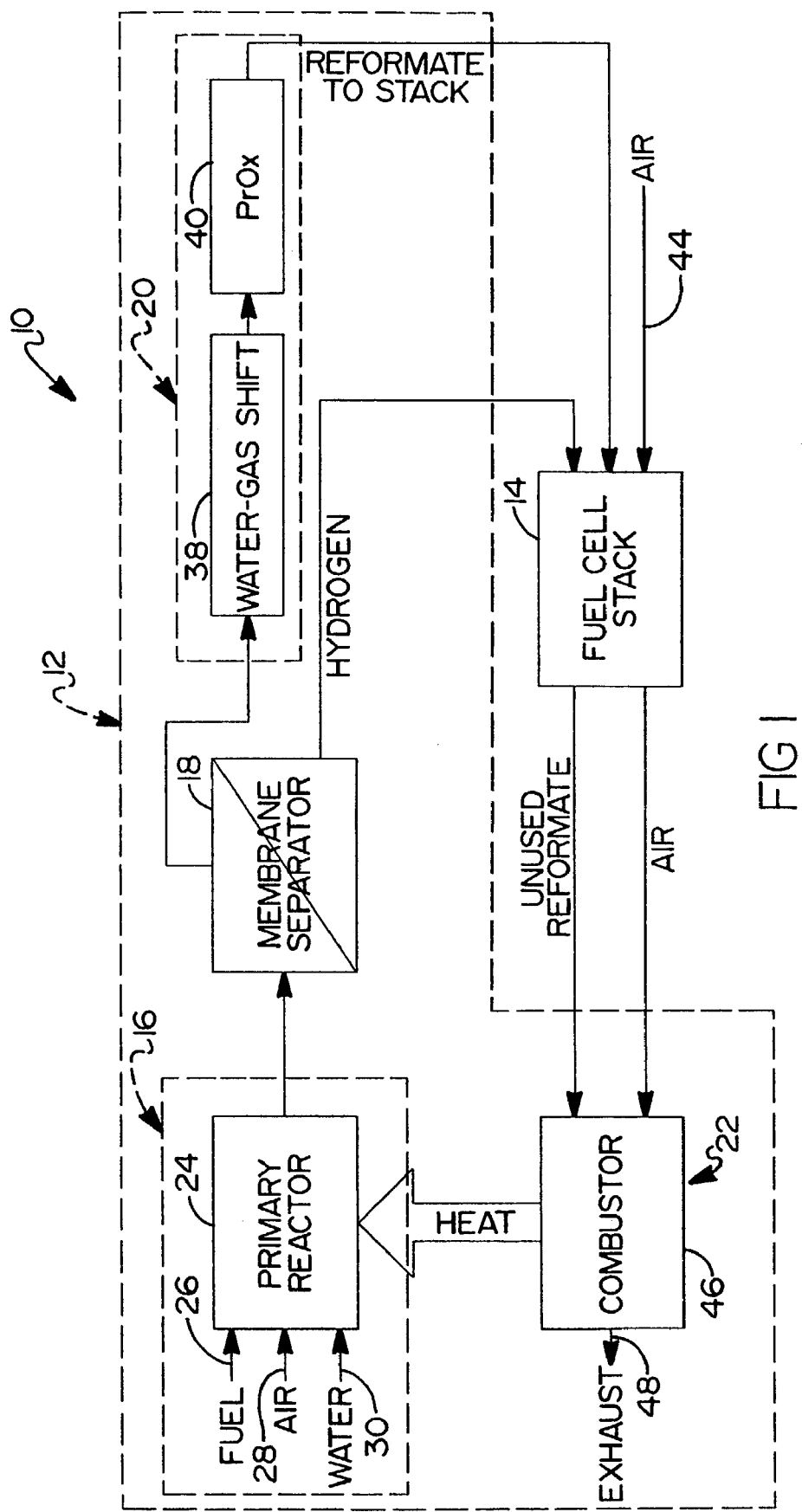
FIG. 1 is a schematic view of a fuel processing system employing a membrane separator according to a first embodiment of the present invention.

The following description of the preferred embodiment(s) is merely exemplary in nature and is in no way intended to limit the invention, its application, or uses.

The present invention is directed toward a fuel cell system 10 including a fuel processing system 12 and a fuel cell stack 14. Fuel cell system 10 will now be described as depicted in FIGS. 1-6, wherein common reference numbers are utilized to represent the same or similar elements. In overview, the fuel processing system 12 includes an autothermal reformer 16, a membrane separator 18, CO-reduction and cleanup section 20, and combustor system 22. As described in more detail below, the fuel processing system 12 functions to take fuel, air and water to produce a hydrogen containing gas. The hydrogen containing gas is then used in the fuel cell stack 14 in order to produce electric current as known in the art.

Referring now to FIG. 1, autothermal reformer 16 includes a primary reactor 24. Primary reactor 24 has three inlets, 26, 28 and 30. The primary reactor 24 accepts fuel, air, and water through inlets 26, 28 and 30 respectively. The primary reactor 24 is of any type that is able to chemically reform fuel, such as, for example, steam reforming, partial oxidation or autothermal reforming, and output hydrogen gas in the reformate. The primary reactor 24 is in fluid communication with the membrane separator 18 for transporting the hydrogen containing reformate stream from the autothermal reformer 16 to the membrane separator 18.

The membrane separator 18 is in fluid communication with the CO-reduction and cleanup section 20 for transporting reformate, and with fuel cell stack 14 for transmitting pure hydrogen or hydrogen-purge mixture.

Generally, the membrane separator 18 provides a mechanism for removing hydrogen from mixtures of gases by selectively allowing hydrogen to permeate through the membrane. A membrane separator useable for this purpose is described in U.S. Pat. No. 6,152,995 to Edlund. Membrane separators 18 are driven by a partial pressure difference of the desired component between the feed and permeate sides of the membrane. The flow of the desired component is from the high pressure feed side to the lower pressure permeate side. In the case of palladium or palladium alloy membranes, hydrogen is selectively permeable through the dense metal membrane. The flux or flow rate of hydrogen through the membrane can be increased by increasing the feed side hydrogen partial pressure, decreasing the permeate side hydrogen partial pressure, or decreasing the thickness of the metal membrane. The limit on the thickness of the membrane is dictated by an acceptable leak rate through holes in the membrane. These holes reduce the selectivity of the membrane allowing all components to pass unselectively. The membrane materials incorporated in the membrane separator 18 are hydrogen permeable materials such as palladium or palladium alloy. Alloys include, but are not limited to, palladium-silver or palladium-copper.

It is envisioned that any configuration of membrane separator 18 is useable. Two possible configurations for the membrane separator 18 and 18' are a tube and shell configuration shown in FIG. 2 and a plate configuration shown in FIG. 3.

Figure 2:
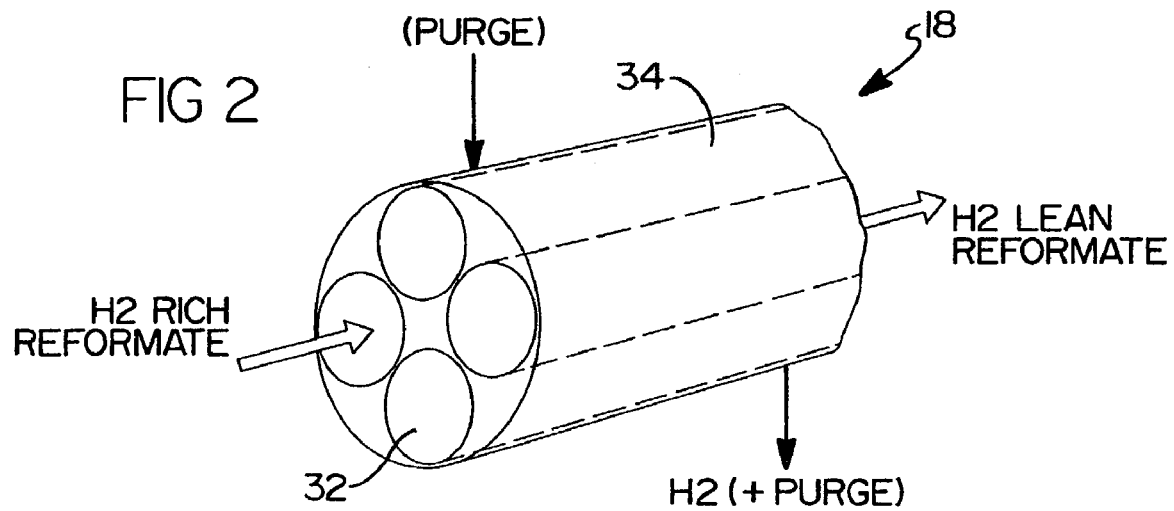
FIG. 2 is a schematic perspective view of a membrane separator according to the principles of the present invention.

Referring briefly to FIG. 2, a tube and shell configuration of membrane separator 18 is shown, wherein the tube configuration includes a number of tubes 32 enclosed in a shell 34. The tubes 32 are made from palladium, a palladium alloy, or a palladium layer on a support material. The support material can be, but not limited to, microporous ceramic, metal support or a combination thereof. The thickness of the palladium or palladium alloy layer on the tubes 32 is less than ten microns. The palladium or palladium alloy layer can also be coated on the inside of the support tubes. Reformate from the autothermal reformer 16 flows through membrane separator 18 either by tube 32 or passed over the shell 34. The flow may be either cross, counter or co-flow. The palladium containing tubes 32 are impermeable to the non-hydrogen components in the reformate stream. Hydrogen, however, dissociates in the palladium. The permeate side has a lower partial pressure of hydrogen and hence, hydrogen atoms will naturally diffuse through the membrane and recombine on the low hydrogen partial pressure side which is the permeate side. The purge stream can flow on the permeate side of the membrane to remove the hydrogen from the reformate stream. The purge stream does this by having a lower hydrogen partial pressure than the reformate stream. The flow of hydrogen is driven by a partial pressure difference in hydrogen between the feed and permeate sides. A purge stream can enhance the permeation by further reducing the hydrogen partial pressure on the permeate side. Thus, the purge stream extracts the hydrogen from the reformate stream, leaving a hydrogen lean reformate stream in fluid communication with the CO-reduction and cleanup section 20 and a hydrogen rich purge stream in fluid communication with the fuel cell stack 14. The purge stream can be any stream that has a lower hydrogen partial pressure than the reformate stream. The surface area of the membrane separator 18 in a tube configuration can be adjusted by altering the tube diameter, number of tubes and tube length. Increasing the surface area of the tubes 32 increases the amount of hydrogen that can be extracted. In addition, a catalyst can be coated on the shell 34.

Figure 3:
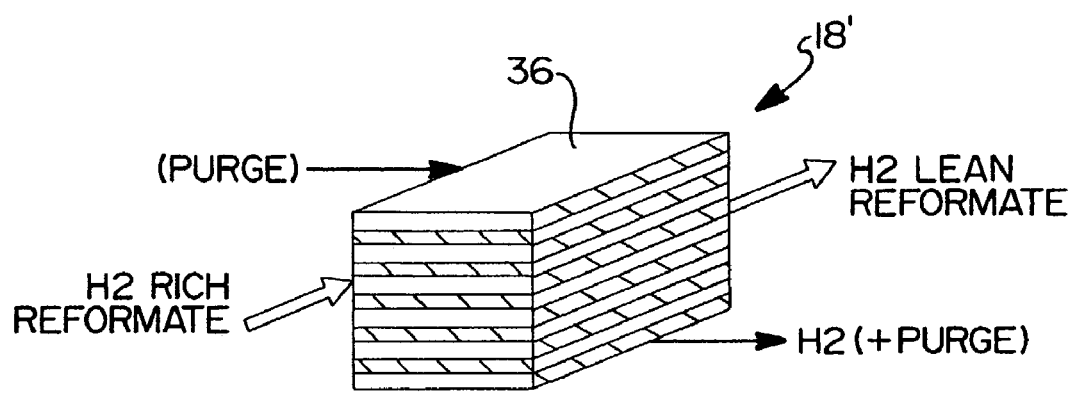
FIG. 3 is a schematic perspective view of a membrane separator according the principles of the present invention.

Now referring briefly to FIG. 3, the plate configuration of the membrane separator 18' is shown. In this configuration, plates 36 are stacked with channels in between each layer, with reformate from the autothermal reformer 16 or hydrogen rich purge flow on opposite sides of the plates 36. The plates 36 are made from palladium, a palladium alloy, or a palladium or palladium alloy layer on a support material. The thickness of the palladium or palladium layer is less than ten microns. The reformate from the autothermal reformer 16 can be fed into the plate configuration membrane separator 18' in cross, counter or co-flow. Similar to the palladium containing tubes 32 of membrane separator 18, the plates 36 are impermeable to the non-hydrogen components in the reformate stream. Hydrogen, however, dissociates into the palladium. The purge stream has a lower hydrogen partial pressure and hence, as it flows over the plates 36, the hydrogen atoms will diffuse through the membrane and recombine on the low hydrogen partial pressure side which is the permeate side. Thus, the purge stream extracts the hydrogen from the reformate stream, leaving a hydrogen lean reformate stream in fluid communication with the CO-reduction and cleanup section 20 and a hydrogen rich purge stream in fluid communication with the fuel cell stack 14. In a plate configuration, the surface area of the membrane separator 18' can be adjusted through the area of the plates, number of plates and through manifolding. Increasing the surface area of the plates 36 increases the amount of hydrogen that can be extracted by the purge stream. In addition, a catalyst can be coated on the plates 36 or substrate within the channels.

With reference to FIG. 1, the CO-reduction and cleanup section 20 is in fluid communication with the membrane separator 18 and may include at least one of a water-gas shift 38 and/or a preferential oxidation reactor or PrOx 40 or any other type of CO-reduction and cleanup reactor known in the art. As shown in FIG. 1, a water-gas shift 38, which functions to create hydrogen from the reaction of carbon monoxide and water, is in fluid communication with the membrane separator 18. The water-gas shift 38 is an equilibrium reaction resulting in the formation of hydrogen. The water-gas shift 38 is in fluid communication with the PrOx 40 to deliver the hydrogen containing reformate stream.

PrOx 40 is in fluid communication with water-gas shift 38, and is used to remove carbon monoxide from the reformate received from the water-gas shift 38. The PrOx 40 creates stack grade hydrogen. The PrOx 40 is in fluid communication with the fuel cell stack 14, and the reformate from the PrOx 40 is transferred to the fuel cell stack 14.

The fuel cell stack 14 is in fluid communication with the CO-reduction and cleanup section 20 and the membrane separator 18 or 18'. The fuel cell stack 14 receives a hydrogen rich stream from the membrane separator 18 and reformate depleted in hydrogen from the CO-reduction and cleanup section 20. Air enters the fuel cell stack 14 via an inlet 44. The fuel cell stack 14 produces electrical power and heat from a controlled reaction of hydrogen with oxygen from the air. The fuel cell stack 14 is in fluid communication with the combustor system 22 for reacting air and any unused hydrogen, carbon monoxide or hydrocarbon.

Referring to FIG. 1, the combustor system 22 includes a combustor 46 in fluid communication with the fuel cell stack 14. Specifically, combustor 46 burns the remaining reformate from the fuel cell stack 14 to produce heat which is used for the autothermal reformer 16. The combustor 46 is in a heat transfer relationship with the autothermal reformer 16 and transmits heat in the form of hot gases from the combustor 46 over the autothermal reformer 16 to aid in maintaining the inlet steam temperature of the primary reactor 24 of the autothermal reformer 16. The exhaust gases from combustion exit the combustor 46 via an outlet 48.

During vehicle operation, fuel, water and air enter the primary reactor 24 and undergo chemical reformation. The reformate from the primary reactor 24 flows into the membrane separator 18. The membrane separator 18 removes some hydrogen from the reformate stream. The hydrogen rich permeate flows from membrane separator 18 into fuel cell stack 14. The hydrogen depleted reformate stream flows into the water gas shift 38, and more hydrogen is generated from the carbon monoxide and water in the reformate stream. The reformate from the water-gas shift 38 enters the PrOx 40 where the carbon monoxide is selectively oxidized. The reformate with very little carbon monoxide enters the fuel cell stack 14 where it reacts with oxygen from the air and undergoes a chemical reaction resulting in the production of electricity. The hydrogen reformate unused by the fuel cell stack 14 flows into the combustor 46. The combustor 46 mixes the unused reformate with air and consumes it, resulting in heat that is used to warm the steam inlet 30 of the primary reactor 24 and exhaust gases that exit the system via the outlet 48.

As shown in FIG. 1, with the stack grade hydrogen sent directly to the fuel cell stack 14, bypassing the water-gas shift 38 and PrOx 40, the start-up time for vehicle operation is reduced. Further, by using the membrane separator 18 upstream from the water-gas shift 38, the equilibrium of the water-gas shift reaction can be pushed further to the product side, resulting in more hydrogen which enhances efficiency. In addition, the removal of hydrogen by the membrane separator 18 results in a more concentrated stream of reactants and can reduce the size of the water-gas shift reactor 38 or push the equilibrium such that less carbon monoxide is sent to the PrOx 40, allowing for a smaller PrOx 40. The size of the PrOx 40 and water-gas shift reactor 38 can also be reduced by increasing the operating pressure of the fuel processor, which is a better operating point for the membrane separator 18.

Figure 4:
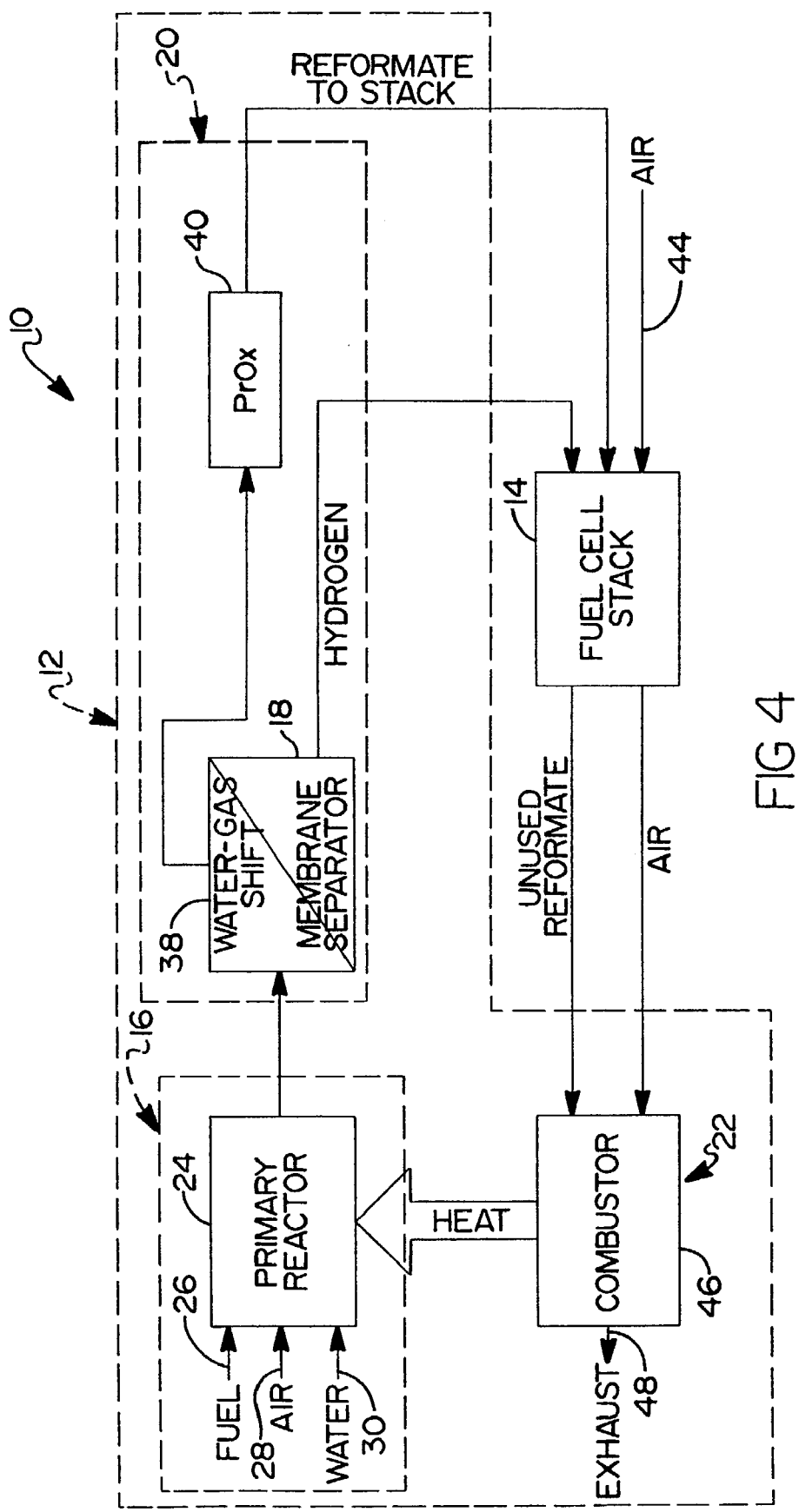
FIG. 4 is a schematic view of an alternative fuel processing system employing a membrane separator integrated with the water-gas shift reformer according to the principles of the present invention.

FIG. 4 shows an alternative embodiment of the fuel processing system 12 including an autothermal reformer 16, membrane separator 18, CO-reduction and cleanup section 20, and combustor system 22. In this embodiment, however, the membrane separator 18 is incorporated within the water-gas shift 38. In this second embodiment, hydrogen is being removed by the membrane separator 18 as it is created. This embodiment provides the benefit of pushing the water-gas shift equilibrium more to the product side in a single unit. In addition, this embodiment results in less carbon monoxide being sent to the PrOx 40.

Figure 5:
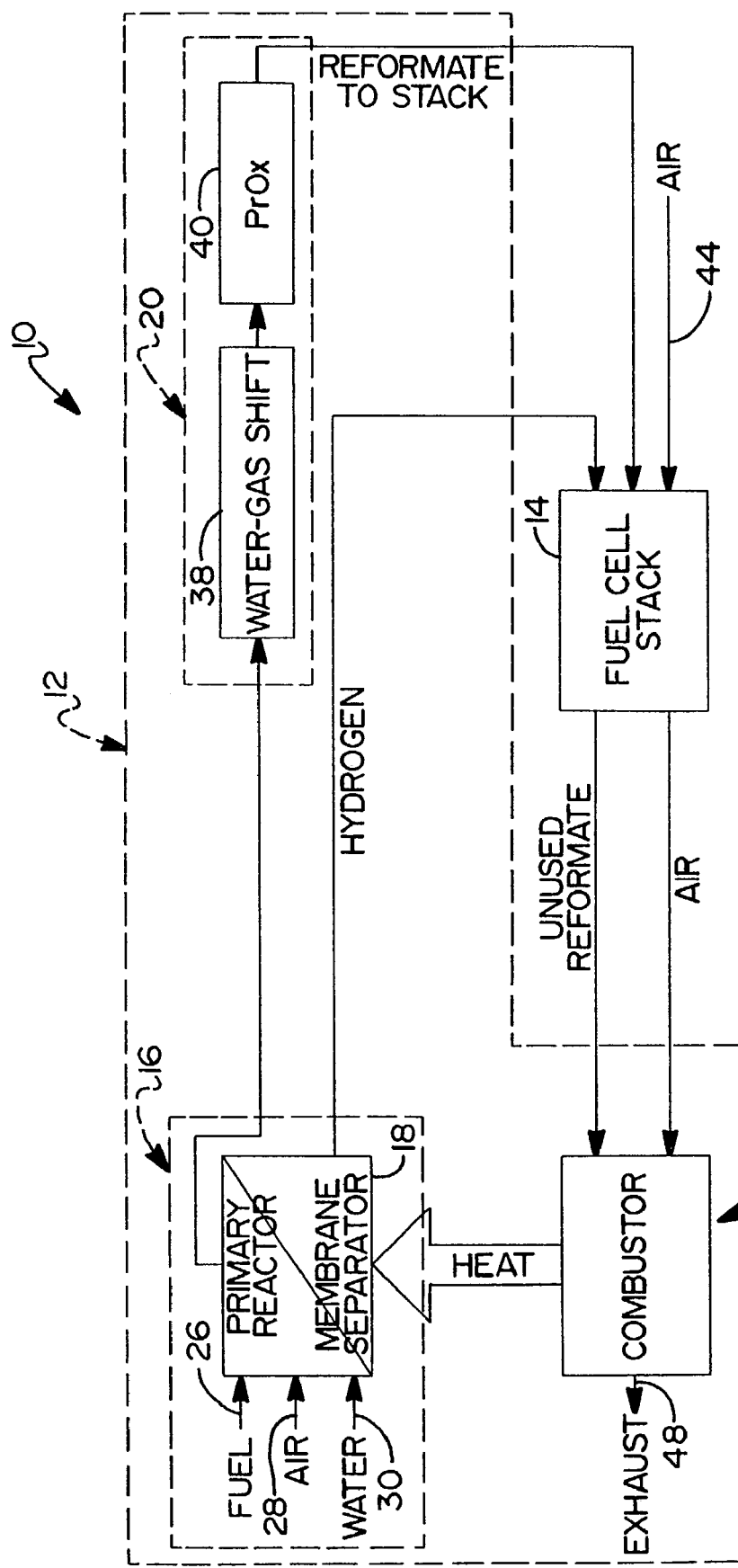
FIG. 5 is a schematic view of a second alternative fuel processing system employing a membrane separator integrated with the primary reactor according to the principles of the present invention.

FIG. 5 depicts another embodiment of the fuel processor of the present invention, including the autothermal reformer 16, membrane separator 18, CO-reduction and cleanup section 20, and combustor system 22 however, the membrane separator 18 is positioned within the primary reactor 24. Similarly, in this embodiment, hydrogen is removed by the membrane separator 18 as it is created. This embodiment provides the benefit of pushing the steam reforming equilibrium to create more hydrogen and results in a reduction of the water-gas shift and PrOx volumes.

Figure 6:
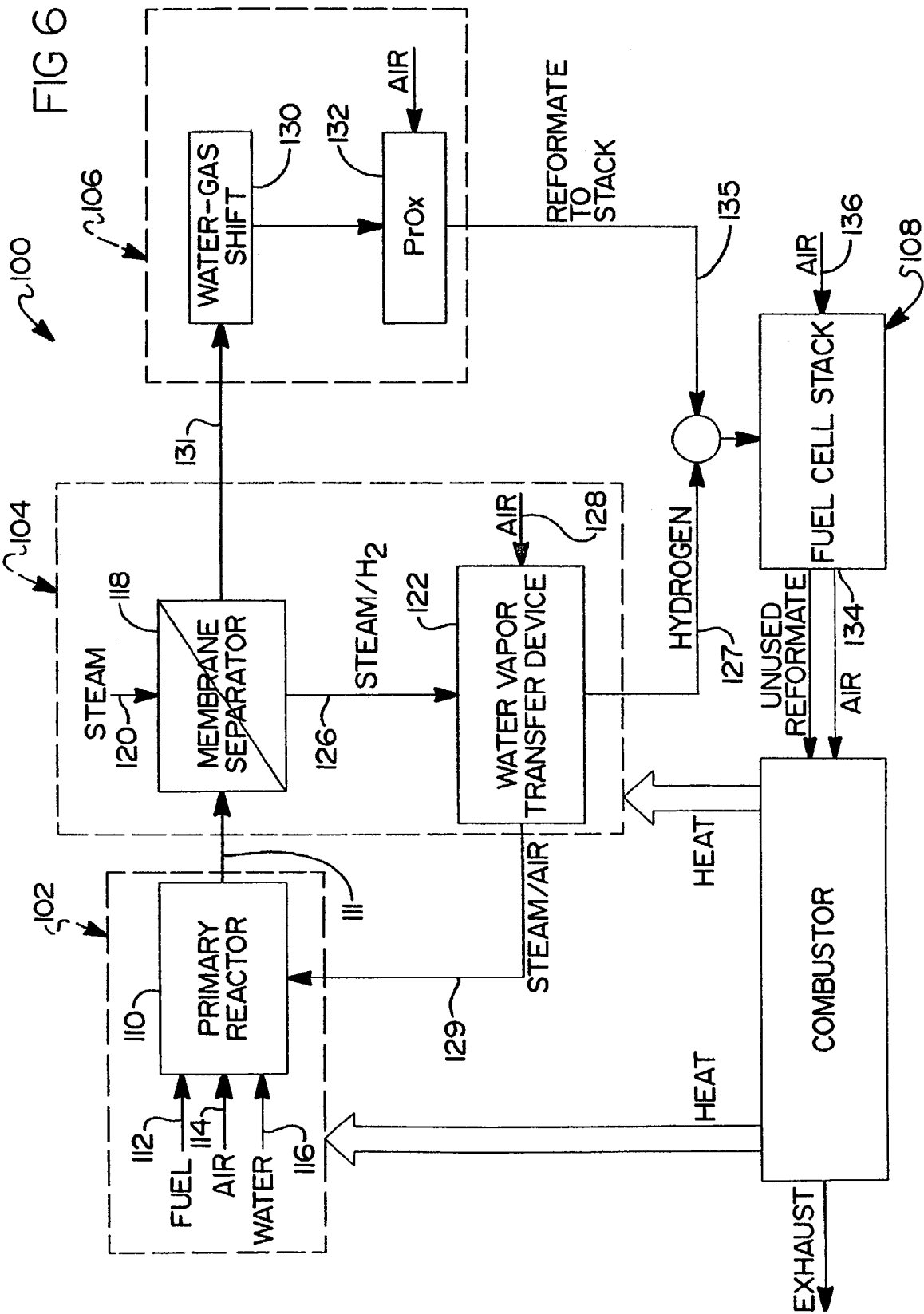
FIG. 6 is a detailed schematic of a fuel processing system employing a membrane separator according to the principles of the present invention.

FIG. 6 shows another embodiment of the fuel cell system 100, shown schematically using steam as a purge gas. Fuel cell system 100 includes an autothermal reforming section 102, membrane system 104, CO-reduction and cleanup section 106, fuel cell stack system 108, and combustor system 107.

The autothermal reforming section 102 includes an autothermal reformer 110. The autothermal reformer 110 has three inlets, 112, 114 and 116, which bring fuel, air and steam, respectively, into the autothermal reformer 110. The autothermal reformer 110 is in fluid communication with the membrane system 104 via conduit 111. Membrane system 104 has two inlets; one is the hydrogen containing reformate 111 and the other is steam 120. The membrane system 104 has three outlets; one is air/steam stream 129 other is hydrogen stream 127, and another is reformate stream 131. It should be noted that stream 129 is useable to supply some of the feed otherwise provided by streams 114 and 116.

The hydrogen containing reformate 111 from the autothermal reforming system 102 enters a membrane separator 118 in the membrane system 104 as discussed earlier. The membrane separator 118 has an inlet 120 for steam which is used as a purge gas to facilitate hydrogen separation from the mixed reformate stream 111. The steam from the inlet 120 facilitates extraction of the hydrogen from the surface of the membrane separator 118, thereby creating a stream 126 that comprises steam and hydrogen.

The stream of hydrogen and steam 126 is transmitted from the membrane separator 118 to a water vapor transfer device 122 in the membrane system 104.

Figure 7:
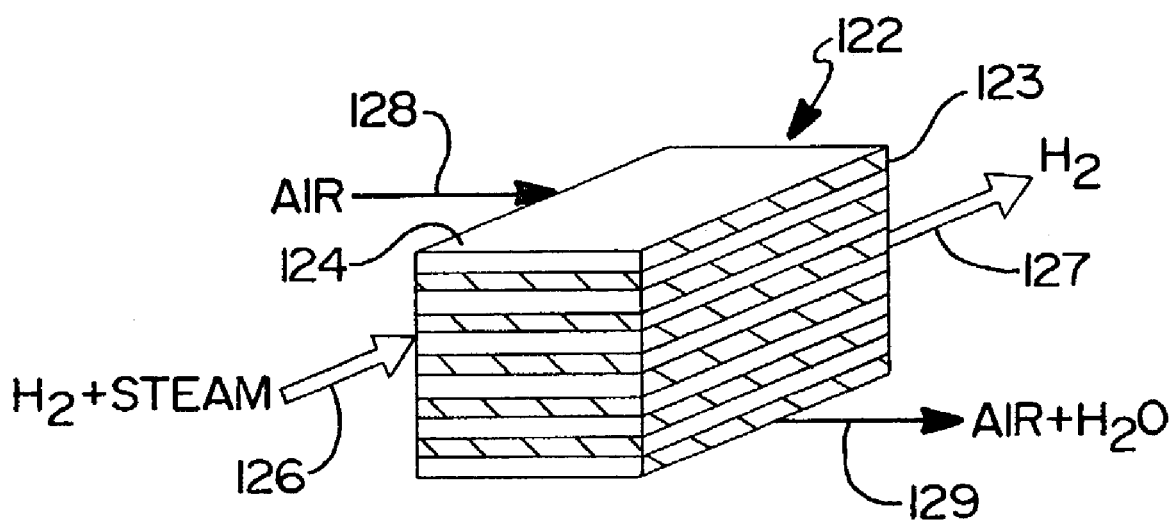
FIG. 7 is a schematic view of a water transfer device used in accordance with the fuel cell system of FIG. 6.

Referring to FIG. 7, the water vapor transfer device 122 has a plurality of conduits 123 shown here as three-dimensional passages. These conduits 123 are connected so as to allow the flow of a primary gas through all of the conduits 123. The direction of the primary fluid is preferably opposite the direction of the flow of the secondary gas. In this embodiment, the primary gas stream 126 comprises steam and hydrogen and the secondary gas stream 128 is air, as shown The device 122 comprises a water transfer membrane 124 which is made from a material which is any material that allows the transfer of water vapor or steam from one fluid stream to another fluid stream. Such material selectively allows the transfer of steam without also allowing the transfer of other gases such as hydrogen. Generally, the water transfer membrane 124 is made from materials which include those made from poly [perfluorosulfonic] acid, sulfonated polystyrene, polyethersulfone, sulfonated polyetherketone, polycarbonates, other sulfonated materials and mixtures thereof. A preferred membrane material is comprised of poly[perfluorosulfonic] acid. A particularly preferred membrane material is sold under the brand name "NAFION" by the E.I. DuPont de Nemours Company. Water vapor transfer devices are also described in commonly-owned applications, U.S. Ser. No. 09/910,331, entitled Water Vapor Transfer Device for a Fuel Cell Power Plant, filed Jul. 20, 2001, and in U.S. Ser. No. 09/910,307, entitled Water Vapor Transfer Device for Fuel Cell Reformer, filed Jul. 20, 2001, each of which is incorporated by reference in its entirety as a teaching tool.

The water transfer membrane 124 selectively allows the transfer of steam from stream 126 containing hydrogen and steam to stream 128 containing air, without allowing significant passage (leaking) of hydrogen from the stream 126 to the air stream 128. Specifically, the hydrogen and steam stream 126 enters the water vapor transfer device 122. The air stream 128 also enters the water vapor transfer device 122. The primary stream of hydrogen and steam 126 flow through the conduits 123 of the water vapor transfer device 122 across a face of membrane 124. The secondary air stream 128 flows across an opposite face of membrane 124. The steam of stream 126 is selectively transferred through the water vapor transfer material 124 into the air stream 128 to form a steam and air stream 129. With the steam removed from the primary stream 126, hydrogen remains in stream 127. This hydrogen stream 127 is then sent to the fuel cell stack system 108.

The outlet 131 of membrane separator 118 is in fluid communication with the CO-reduction and cleanup system 106 for transmittal of the hydrogen lean reformate stream. The CO-reduction and cleanup system 106 may include a water-gas shift 130 and/or a PrOx 132. The water-gas shift 130 is in fluid communication with the membrane system 104 for receiving the reformate stream. The water-gas shift 130 is an equilibrium reaction resulting in the formation of hydrogen. The reformate stream from the water-gas shift 130 enters the PrOx 132. The PrOx 132 is used to remove carbon monoxide from the reformate received after the water-gas shift 130. The PrOx 132 is in fluid communication with the fuel cell stack system 108 and creates stack grade stream 135 containing hydrogen for the fuel cell stack system 108.

Accordingly, the fuel cell stack system 108 is in fluid communication with the CO-reduction and cleanup system 106 to receive stack grade stream 135 containing hydrogen and includes a fuel cell stack 134. The hydrogen reformate stream 135 from the CO-reduction and cleanup system 106 enters the fuel cell stack 134, in addition to the hydrogen stream 127 supplied from the membrane system 104. The fuel cell stack 134 has an air inlet 136. The fuel cell stack 134 produces electrical power heat from a controlled reaction of hydrogen and oxygen from the air.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel processing system comprising:
   a reactor for reforming a hydrocarbon fuel stream into a reformate stream comprising hydrogen and other constituents;
   a membrane separator for removing hydrogen from said reformate stream, said membrane separator comprising a membrane relatively permeable to hydrogen and relatively less permeable to said other constituents, said membrane separator including a plurality of tubes for flowing said reformate across said membrane to cause separation of said hydrogen from said reformate stream, said membrane separator comprising a palladium or palladium alloy layer defining a surface of each of said plurality of tubes;
   a CO-reduction and cleanup system for further reforming of said reformate stream; and
   a purge fluid system in communication with said membrane separator to facilitate hydrogen transport from said membrane separator, wherein said purge fluid system comprises a stream, having lower hydrogen partial pressure than said reformate, for directing removed hydrogen from said membrane separator; and
   a water transfer device comprising a membrane relatively permeable to water and relatively less permeable to hydrogen for separating steam from removed hydrogen.

2. The fuel processing system of claim 1 wherein said water transfer device further comprises a source of air providing momentum for directing separated steam from said water transfer device.

* * * * *